(12) United States Patent
Greenfield et al.

(10) Patent No.: US 6,404,642 B1
(45) Date of Patent: Jun. 11, 2002

(54) SWING-OUT HARD DRIVE APPARATUS

(75) Inventors: Matthew David Greenfield, Austin; Timothy Radloff, Round Rock; Brently L. Cooper, Hutto, all of TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 09/712,048

(22) Filed: Nov. 14, 2000

(51) Int. Cl.[7] .................................................. G06F 1/70
(52) U.S. Cl. ........................ 361/727; 361/679; 361/683; 361/686; 361/724; 361/725
(58) Field of Search .......................... 361/679, 683–686, 361/724–727

(56) References Cited

U.S. PATENT DOCUMENTS

| | | | |
|---|---|---|---|
| 5,561,893 A | * 10/1996 | Lee | 29/434 |
| 5,572,402 A | * 11/1996 | Jeong | 361/685 |
| 5,586,003 A | 12/1996 | Schmitt et al. | |
| 5,652,695 A | 7/1997 | Schmitt | |
| 5,745,342 A | 4/1998 | Jeffries et al. | |
| 5,777,848 A | 7/1998 | McAnally et al. | |
| 5,790,372 A | 8/1998 | Dewey et al. | |
| 5,838,537 A | * 11/1998 | Lundgren et al. | 361/683 |
| 5,917,696 A | * 6/1999 | Peng | 361/686 |
| 6,097,591 A | * 8/2000 | Ircha | 361/683 |
| 6,208,506 B1 | * 3/2001 | Pao | 361/683 |

* cited by examiner

*Primary Examiner*—Darren Schuberg
*Assistant Examiner*—Yean-Hsi Chang
(74) *Attorney, Agent, or Firm*—Haynes and Boone, LLP

(57) ABSTRACT

A hard drive is accessed by providing a chassis, mounting a slider for reciprocating into and out of the chassis, and mounting a hard drive housing for rotating in the chassis. The hard drive housing has a hard drive opening. The housing and the slider are connected so that the slider reciprocates out of the chassis to support the housing in response to the access opening of the housing being rotated out of the chassis, and so that the slider reciprocates into the chassis for storage, in response to the access opening being rotated into the chassis.

20 Claims, 5 Drawing Sheets

US 6,404,642 B1

SWING-OUT HARD DRIVE APPARATUS

BACKGROUND

The disclosures herein relate generally to computer systems and more particularly to cooling and accessing hard drives mounted in a computer chassis.

A computer unit, such as a server for example, includes a hard drive or a stack of hard drives. The hard drives are stored in a chassis including a hard drive housing such that an access face of the hard drive housing is flush mounted with a surface of the chassis. At the rear of the housing, opposite the access face, a backplane is provided. A hard drive inserted into the housing is plugged into a connector provided on the backplane.

The backplane is a solid planar member and is positioned perpendicular to the hard drive. As such, the backplane is perpendicular to, and blocks the flow of, cooling air which flows through the housing to remove heat generated by the hard drive. Also, the depth of the hard drive, being greater than its width, creates an elongated flow path for cooling air to travel through the housing.

In order to provide adequate cooling for the hard drive housing, larger fans, blowers and ducting may be provided. However, this creates problems because such solutions occupy valuable space within the unit and add to the system noise, power consumption and cost. Another solution may be to provide vent holes in the backplane, but this limits backplane design options.

Therefore, what is needed is a hard drive housing which provides access to remove and insert hard drives when required, and which is adequately cooled for removing heat generated by the hard drives.

SUMMARY

One embodiment, accordingly, permits the hard drive housing to be mounted in the unit, such that the backplane is parallel to the direction of cooling air flow, and also permits access for removing and inserting hard drives when required. To this end, a swing-out hard drive device includes a chassis, a slider reciprocably mounted in the chassis, and a housing rotatably mounted in the chassis and connected to move the slider into and out of the chassis in response to rotation of the housing in the chassis.

A principal advantage of this embodiment is that cooling of the hard drives is enhanced and access to the hard drives is not compromised.

DETAILED DESCRIPTION

Figure 1:
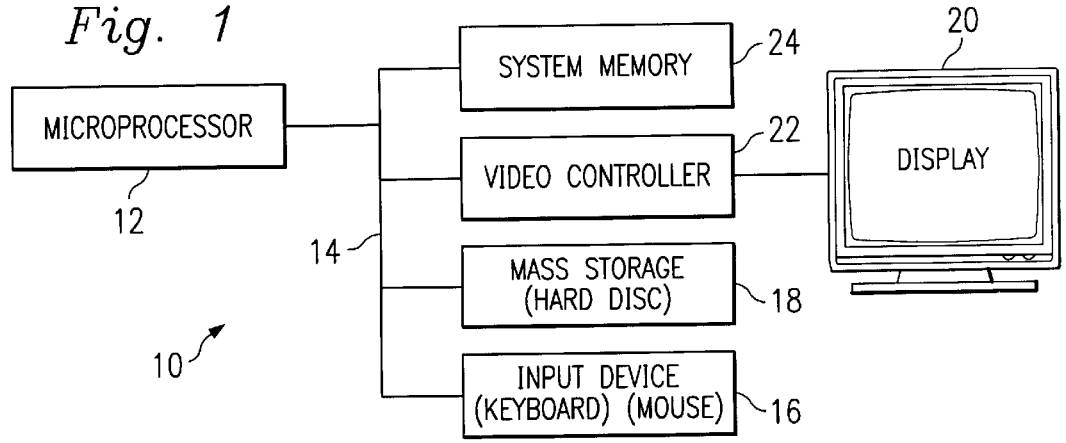
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touch screens, and pointing devices such as mouses, trackballs and trackpads. Programs and data are stored in a mass storage device 18 which is coupled to microprocessor 12. Mass storage devices include such devices as hard disks, optical disks, magneto-optical drives, floppy drives and the like. Computer system 10 further includes a display 20, which is coupled to microprocessor 10 by a video controller 22. System memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
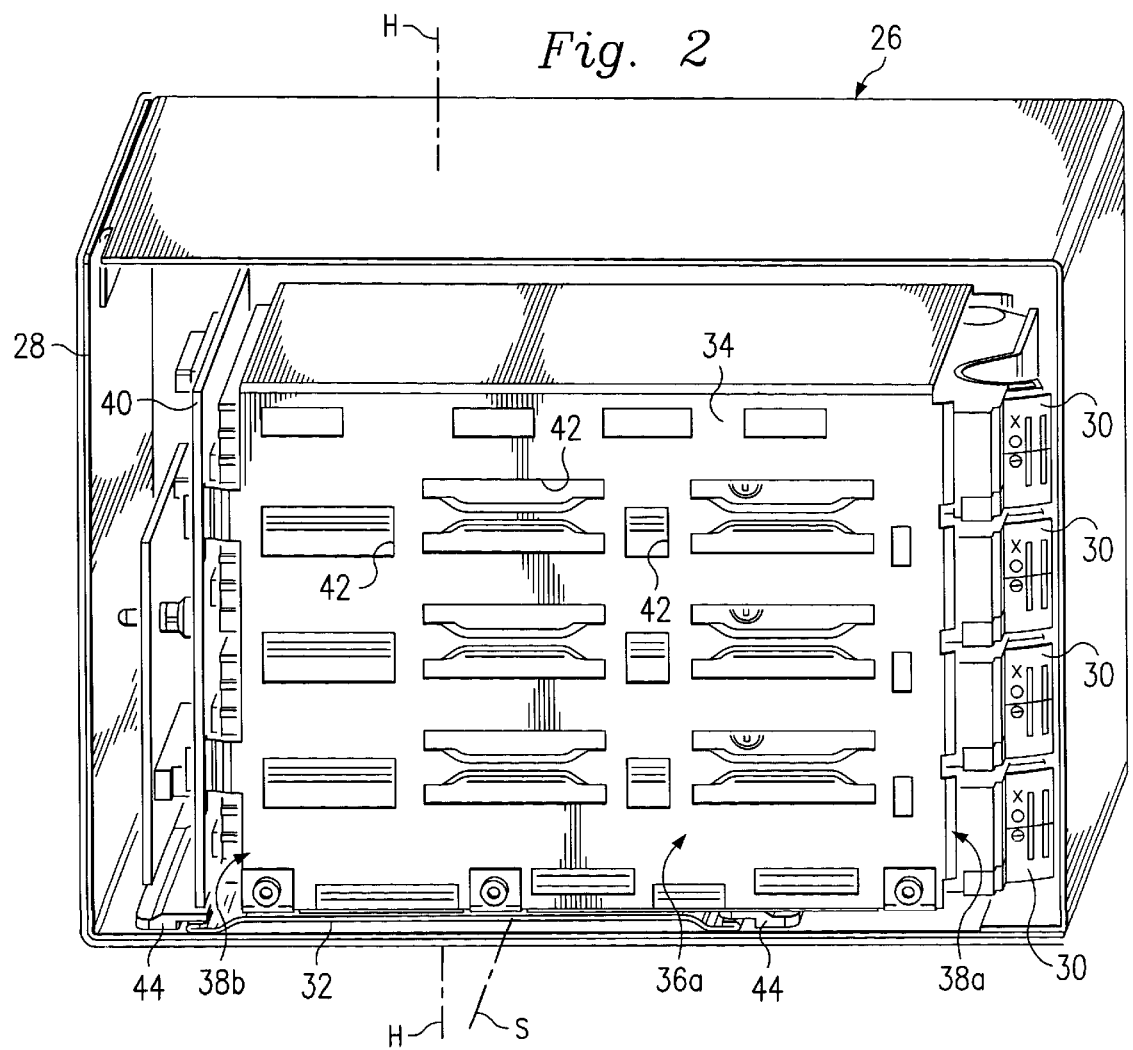
FIG. 2 is an isometric view illustrating an embodiment of a hard drive housing mounted in a chassis.
Figure 3:
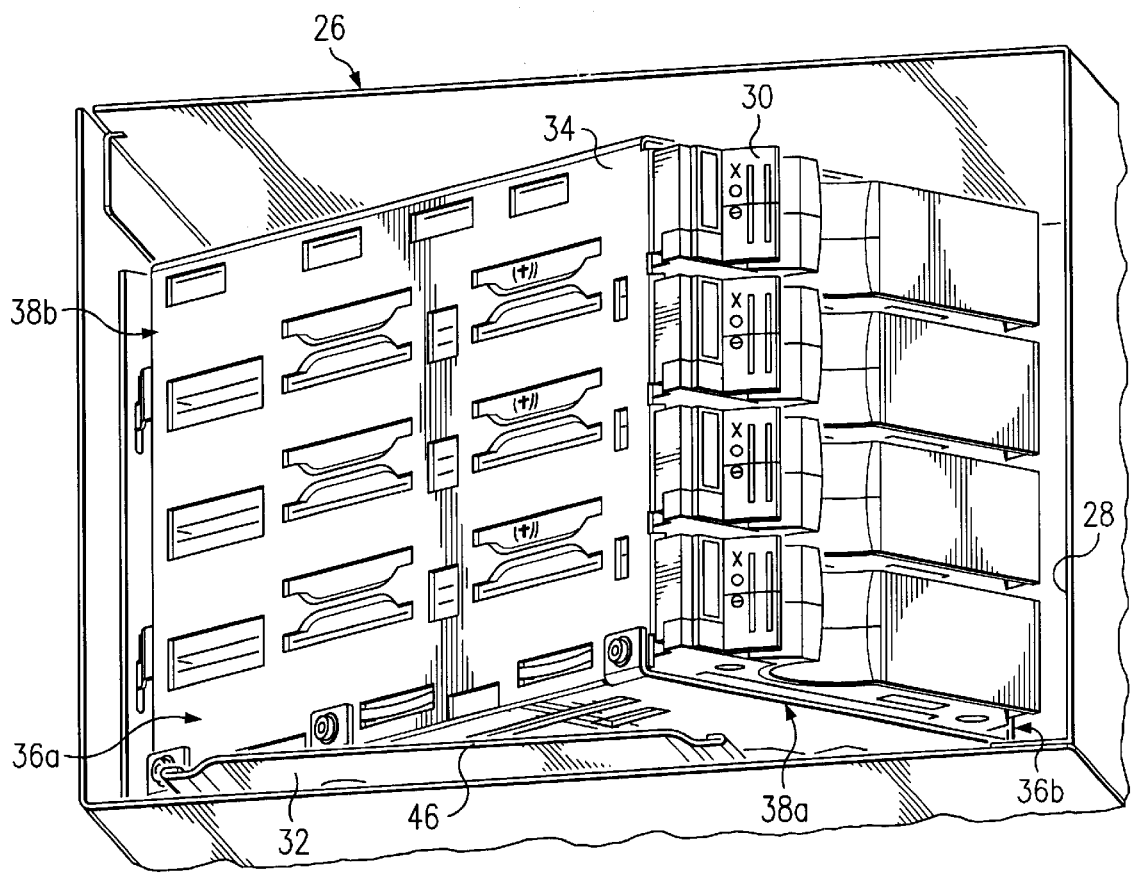
FIG. 3 is an isometric view illustrating the hard drive housing of FIG. 2, partially rotated out of the chassis.
Figure 4:
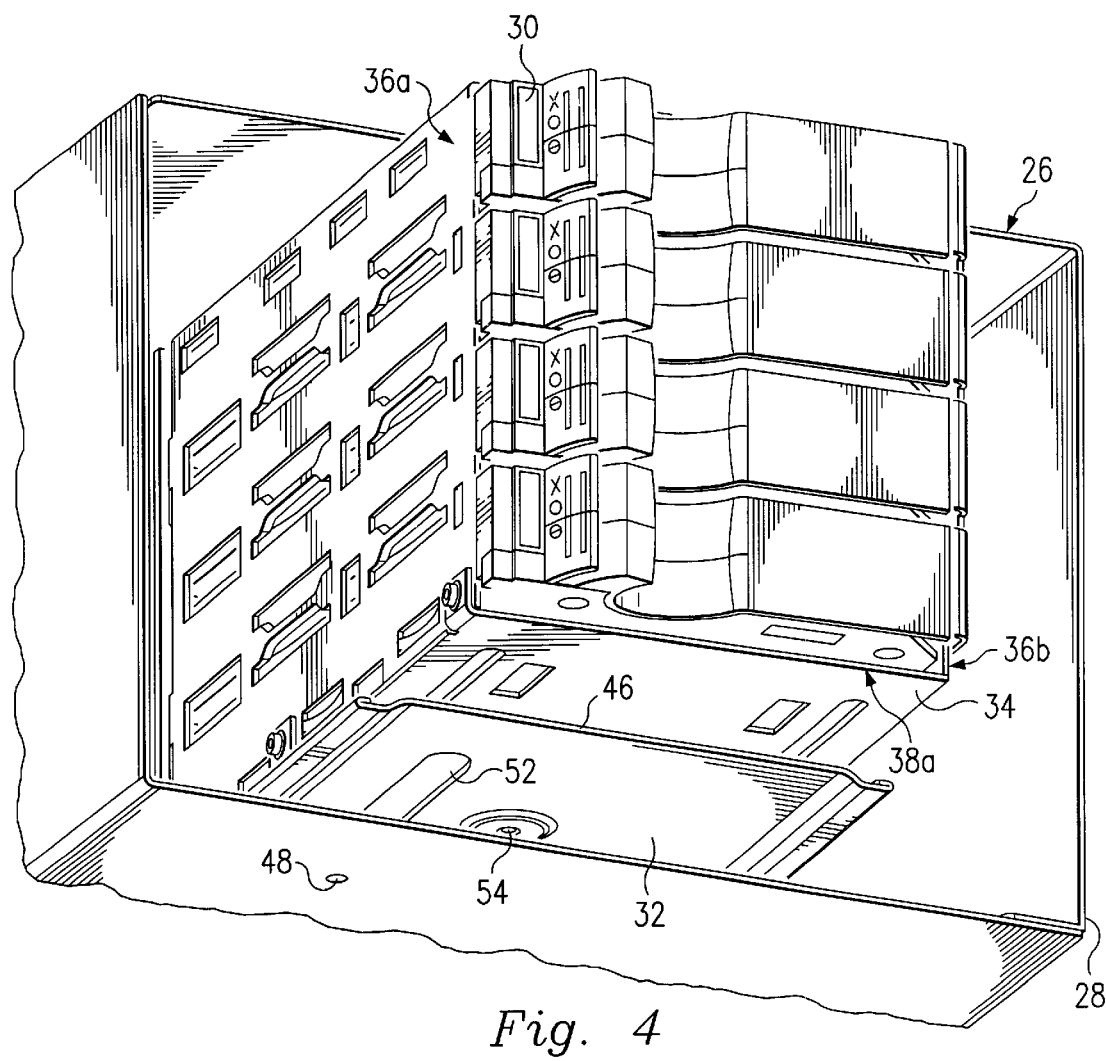
FIG. 4 is an isometric view illustrating the hard drive housing of FIG. 2, fully rotated out of the chassis.

A portion of a computer chassis 26, FIGS. 2–4, of the computer system 10 may include a housing 34 for storing mass storage devices 18, discussed above, such as one or more hard drives 30. A slider 32 is reciprocably mounted in the chassis 26. Also, housing 34 is rotatably mounted in the chassis 26 and is connected to move the slider 32 into and out of the chassis 26, in response to rotation of the housing 34 within the chassis 26.

Housing 34 is in the shape of a rectangular box and includes opposite sides 36a, 36b, FIG. 4, and opposite ends 38a, 38b, FIG. 2. The opposite sides 36a, 36b are vented for cooling air to flow across the hard drive 30 Only one of the sides 36a is clearly shown but both sides 36a, 36b are of the same construction in that they include a plurality of vent openings 42. The first opposite end 38a is an open end for inserting a stack of the hard drives 30. The second opposite end 38b includes a backplane 40 which includes connectors, not shown, for plugged connection with each of the hard drives 30. Because the, backplane 40 is substantially solid, it inhibits air flow therethrough.

The housing 34, FIG. 2, rotates about an axis H, which extends vertically through the housing 34. The slider 32 has an axis S, of reciprocal horizontal movement and axis S is perpendicular to axis H. A pair of spaced guides 44, engage opposite sides of slider 32 to guide the slider 32 as it reciprocates into and out of chassis 26. The end 38a of housing 34 rotates about axis H to extend out of the chassis 26, FIGS. 3 and 4. Also, a support end 46 of slider 32 extends out of chassis 26 in response to the end 38a of housing 34 being extended out of the chassis 26 to provide support to the extended housing.

Figure 5:
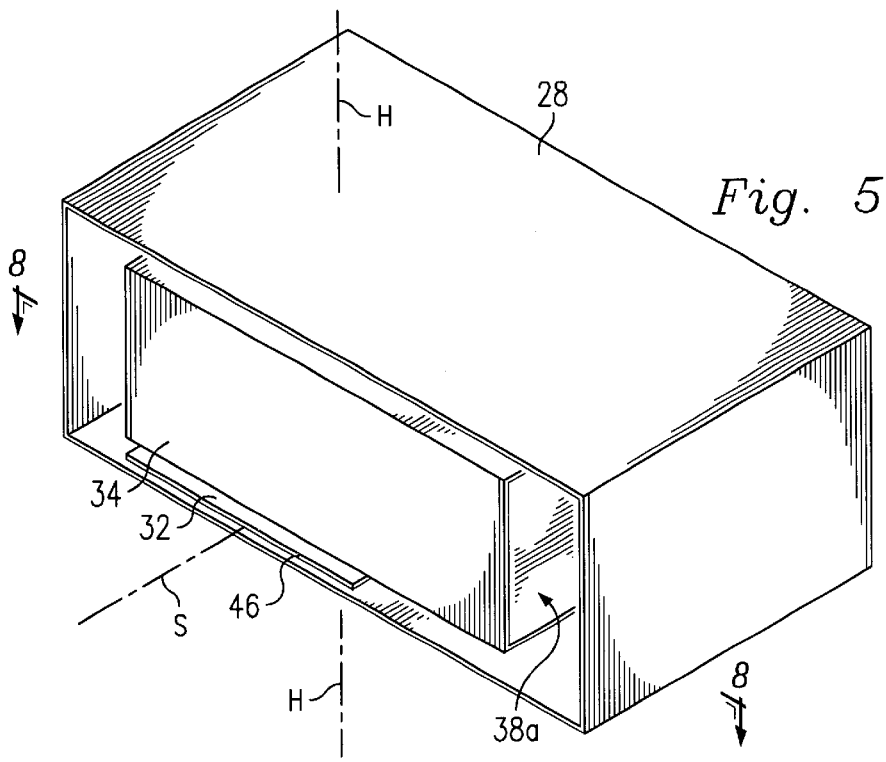
FIG. 5 is an isometric view graphically illustrating an embodiment of a hard drive housing and slider mounted in a chassis.
Figure 6:
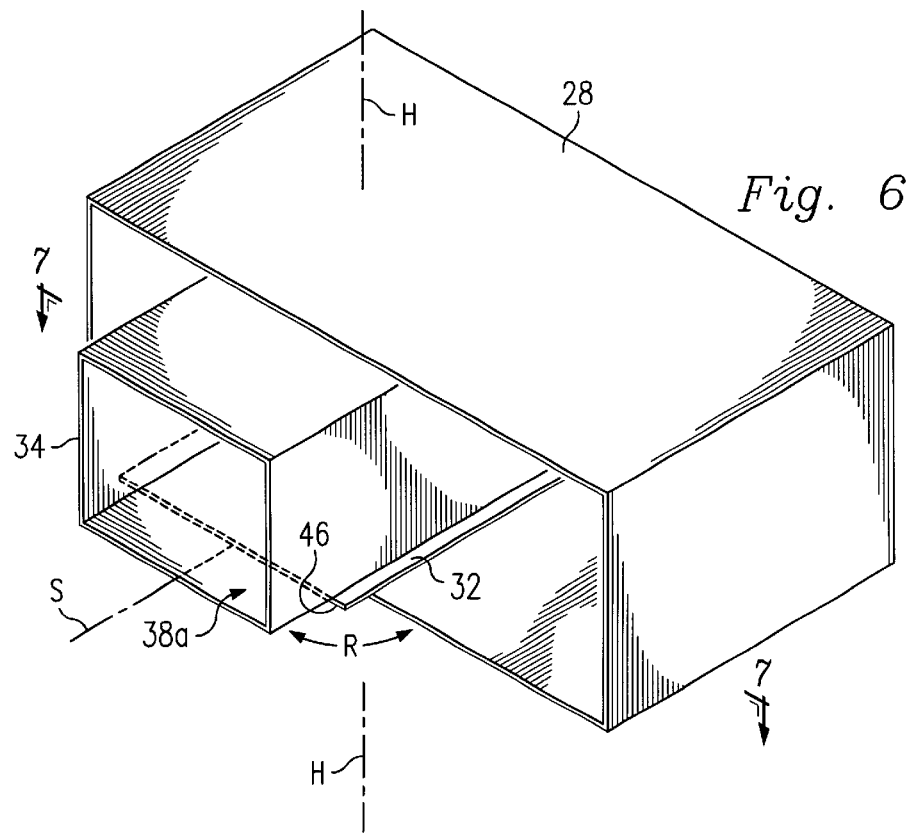
FIG. 6 is an isometric view graphically illustrating the hard drive housing fully rotated out of the chassis.

This is further graphically illustrated in FIGS. 5 and 6, wherein housing 34 rotates about axis H and slider 32 reciprocates along axis S. The end 38a of housing 34 rotates along arc R about axis H to extend out of chassis 26. Also, support end 46 of slider 32 extends out of chassis 26 along the axis S, in response to the end 38a of housing 34 being rotated out of the chassis 26 to provide support to the extended housing.

Figure 7:
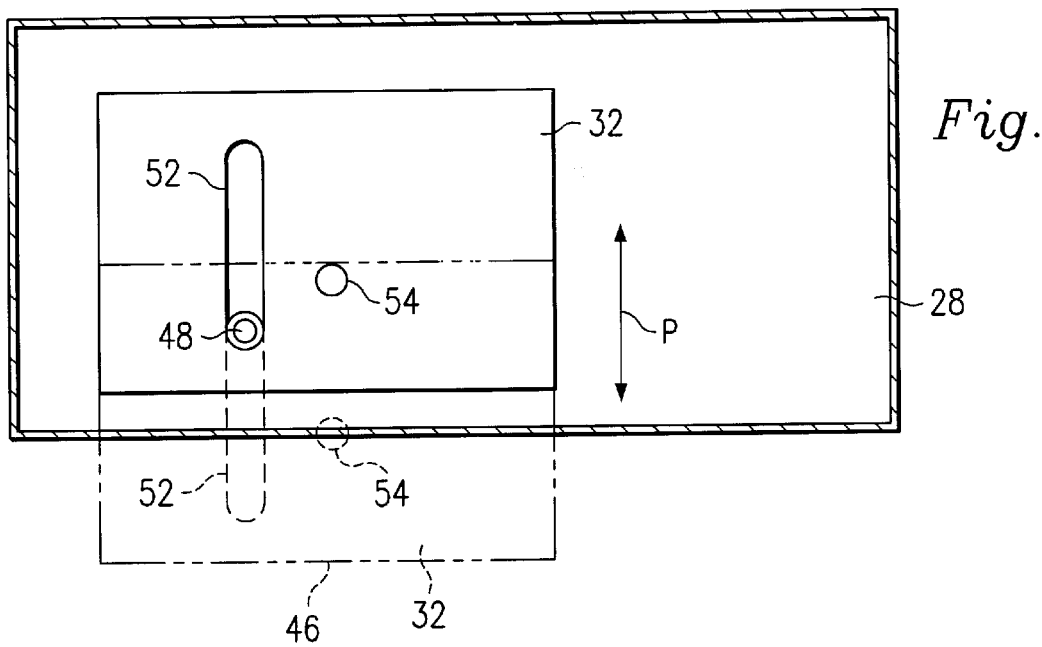
FIG. 7 is a plan view graphically illustrating the movement of the slider in the chassis as viewed along the line 7—7 of FIG. 6.
Figure 8:
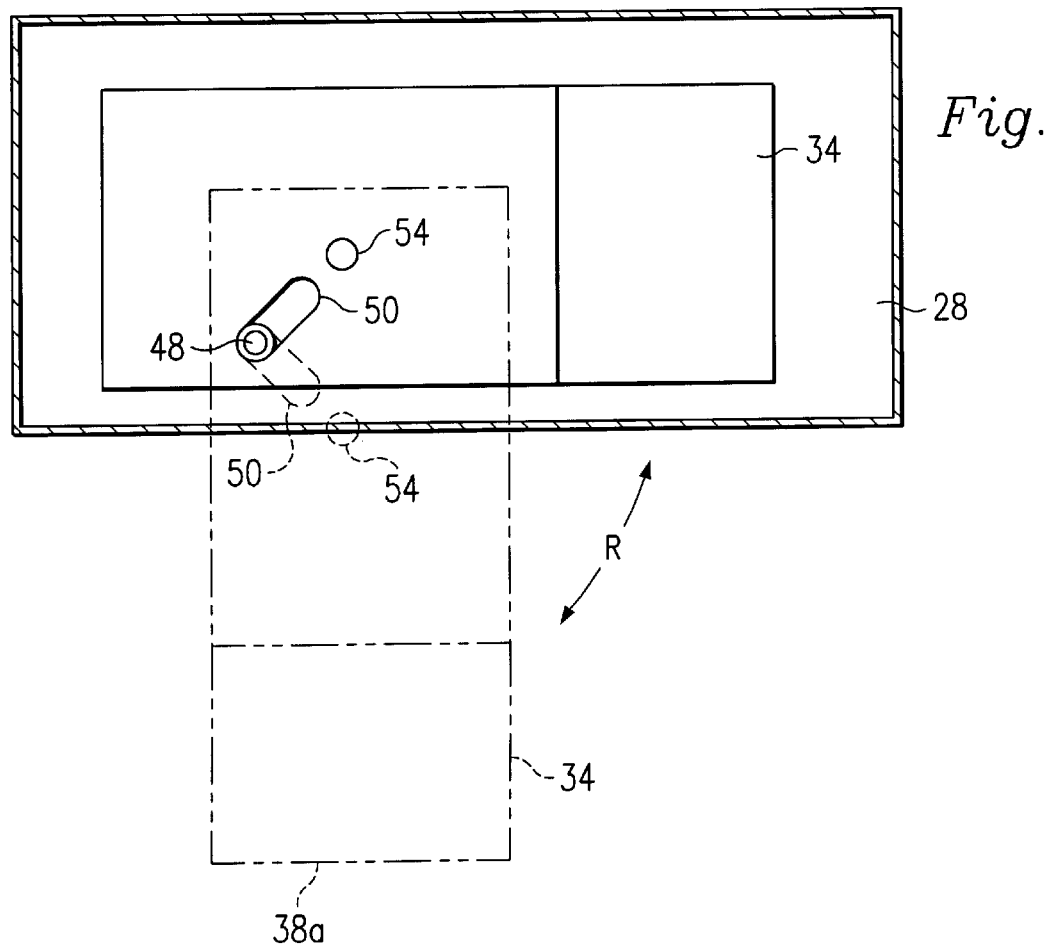
FIG. 8 is a plan view graphically illustrating the movement of the hard drive housing in the chassis as viewed along the line 8—8 of FIG. 5.

This is accomplished by housing 34 being connected to the chassis 26 by a pivot member 48, FIGS. 7 and 8. Pivot member 48 connects to chassis 26 at a slot 50 formed in housing 34. Pivot member 48 also extends through an elongated slot 52 formed in slider 32 and adjacent slot 50 of housing 34. Thus, pivot member 48 extends through the slot 52 in slider 32 and into slot 50 for connection to housing 34. A connector 54 connects housing 34 to slider 32. Connector 54 is spaced apart from the pivot member 48. When housing 34 is rotated as described above, slot 52 of slider 32 and the slot 50 of housing 34 move relative to pivot member 48. Connector 54 moves in a line or path P relative to pivot member 48 in response to rotation of housing 34. As such, the connector 54 drives slider 32 into and out of housing 34 in response to rotation of housing 34.

As can be seen, the principal advantages of these embodiments are that the hard drive bay is mounted so that the access opening of the bay swings out of the chassis for facilitating insertion and removal of the hard drives. Also, with the backplane mounted parallel to the flow of cooling air directed through the bay, smaller fans, blowers and ducting may be used because there is less resistance to air flow and less distance for the cooling air to travel to transverse the bay. This reduces noise and conserves space.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein. For example, the housing could be hinge mounted to swing-out of the chassis but would not have the benefit of the slider support as stated above.

What is claimed is:

1. A swing-out hard drive apparatus comprising:
   a chassis;
   a slider reciprocably mounted in the chassis; and
   a housing rotatably mounted in the chassis and connected to move the slider into and out of the chassis in response to rotation of the housing in the chassis.

2. The apparatus as defined in claim 1 wherein the housing rotates about a vertical axis extending through the housing.

3. The apparatus as defined in claim 2 wherein the slider has an axis of reciprocal movement, the axis of reciprocal movement being perpendicular to the vertical axis extending through the housing.

4. The apparatus as defined in claim 1 wherein a pair of spaced guides engage opposite sides of the slider.

5. The apparatus as defined in claim 1 wherein the housing includes an access opening at a first end and a backplane at a second end opposite the first end.

6. The apparatus as defined in claim 5 wherein the first end of the housing is rotatable to extend out of the chassis.

7. The apparatus as defied in claim 6 wherein the slider has a support end which extends out of the chassis adjacent to the first end of the housing in response to the first end of the housing being extended out of the chassis.

8. The apparatus as defined in claim 5 wherein the housing includes opposite sides which are spaced apart and substantially parallel, the sides extending between the first end and the second end.

9. The apparatus as defined in claim 8 wherein the sides include vent openings formed therein.

10. The apparatus as defined in claim 1 wherein the housing is connected to the chassis by a pivot member.

11. The apparatus as defined in claim 10 wherein the slider is between the housing and the chassis so that the pivot member extends through the slider.

12. The apparatus as defined in claim 11 wherein the slider includes an elongated slot therein for receiving the pivot member.

13. The apparatus as defined in claim 12 wherein the housing is connected to the slider by a connector spaced apart from the pivot member.

14. The apparatus as defined in claim 13 wherein the housing includes a slot therein.

15. The apparatus as defined in claim 14 wherein the slot of the housing and the slot of the slider move relative to the pivot member in response to rotation of the housing.

16. The apparatus as defined in claim 13 wherein the connector moves in an accurate path about the pivot member in response to rotation of the housing.

17. The apparatus as defined in claim 16 wherein the connector drives the slider into and out of the housing in response to rotation of the housing.

18. A computer system comprising:
    a chassis;
    a microprocessor mounted in the chassis;
    a input coupled to provide input to the microprocessor;
    a storage coupled to the microprocessor;
    a video controller coupled to the microprocessor;
    a memory coupled to provide storage to facilitate execution of computer programs by the microprocessor;
    a slider reciprocably mounted in the chassis; and
    a housing rotatably mounted in the chassis and connected to move the slider into and out of the chassis in response to rotation of the housing in the chassis.

19. A method of accessing a computer component comprising:
    providing a chassis;
    mounting a slider for reciprocating into and out of the chassis;
    mounting a component housing for rotating in the chassis; and
    connecting the component housing and the slider so that the slider reciprocates into and out of the chassis in response to the housing being rotated in the housing.

20. A method of accessing a hard drive comprising:
    providing a chassis;
    mounting a slider for reciprocating into and out of the chassis;
    mounting a hard drive housing for rotating in the chassis, the hard drive housing having a hard drive access opening therein; and
    connecting the housing and the slider so that the slider reciprocates out of the chassis to support the hard drive housing, in response to the access opening of the hard drive housing being rotated out of the chassis, and so that the slider reciprocates into the chassis for storage therein, in response to the access opening being rotated into the chassis.

* * * * *